April 20, 1965   C. L. MILLIGAN   3,178,882
SUPERCHARGER METHOD AND EQUIPMENT
Filed Feb. 6, 1961   6 Sheets-Sheet 1

INVENTOR.
CHARLES L. MILLIGAN
BY John J. McLoughlin
ATTORNEY

April 20, 1965     C. L. MILLIGAN     3,178,882

SUPERCHARGER METHOD AND EQUIPMENT

Filed Feb. 6, 1961     6 Sheets-Sheet 2

INVENTOR.
CHARLES L. MILLIGAN
BY
ATTORNEY

INVENTOR.
CHARLES L. MILLIGAN
BY
ATTORNEY

INVENTOR.
CHARLES L. MILLIGAN
BY
ATTORNEY 3,178,882
SUPERCHARGER METHOD AND EQUIPMENT
Charles L. Milligan, Glendale, Ariz.
(4631 N. 53rd Drive, Phoenix, Ariz.)
Filed Feb. 6, 1961, Ser. No. 82,098
1 Claim. (Cl. 60—13)

My invention relates in general to a super-charger for internal combustion engines such as employed in automobile passenger cars, relatively small trucks and the like. My invention relates more in particular to an improved type of supercharger having general use on internal combustion engines, and to an improved method of providing combustible mixture to such engines by the utilization of improved supercharging principles.

The general principle of the supercharger as applied to internal combustion engines is many years old. Generally speaking, superchargers have comprised a vaned impeller usually driven at very high speed by various means including turbines driven by exhaust gases. Such superchargers have in general been effective only when operated on aircraft engines to compress rarefied air at relatively high altitudes to maintain the air-to-gas ratio, and have been operated on the principle of delivering air under relatively higher pressure to a carburetor which thereafter operates in accordance with standard carburetion principles.

Theoretically supercharging should be effective to increase the efficiency of internal combustion engines operating at variable speeds at an ambient atmospheric pressure of about one atmosphere, but structures and methods heretofore suggested have not been effective for various reasons. In addition to the relatively high cost of the supercharger itself as heretofore made available, in general it has required the use of special carburetors, special manifolds and other special modified equipment so that the use of available superchargers as accessory equipment has been extremely limited. In general, also, improvements in internal combustion engine performance have not been sufficiently marked to warrant adoption of supercharging devices as standard or optional equipment by the manufacturers.

The principal object of the present invention is the provision of an improved, relatively low cost supercharger for internal combustion engines.

Another object is the provision of a supercharger particularly adapted for use with internal combustion engines on passenger cars and relatively small trucks and the like.

Still another object is the provision of an improved supercharger for internal combustion engines which overcomes many of the disadvantages of previously suggested supercharger methods and equipment.

A further object is the provision of an improved supercharger for use on internal combustion engines which may be installed as an accessory with the replacement of substantially no parts in the system, and which markedly improves the performance of the engine.

A still further object is the provision of a supercharger device having pronounced advantages in improving combustion and reducing the amount of smog-forming constituents in the engine exhaust.

A still further object is to completely burn crank case vapors by thoroughly mixing the same with the combustible mixture delivered to the engine cylinders.

Still a further object is the utilization in a supercharger device of a screen comprising a catalytic material functioning to promote combustion of fuel to reduce the amount of smog-forming compounds in the engine exhaust.

Other specfic objects and features of the invention will be apparent from the following detailed description taken with the accompaniyng drawings, wherein.

In accordance with the general features of my invention, I provide a supercharging impeller in a shallow chamber, open at top and bottom, for receiving a combustible mixture directly from the carburetor and delivering it directly to the intake manifold. The housing comprising such shallow chamber is mounted directly on top of the intake manifold on the bracket to which the carburetor is normally attached, and the carburetor then being attached directly to the top of the shallow chamber. The combustible mixture is delivered from a single barrel, two-barrel or four-barrel carburetor just as such combustible mixture is normally delivered to the intake manifold, and the top and bottom housing covers are shaped to act as adapters to fit the supercharger to any standard commercial installation without the utilization of any special parts except the supercharger itself. The combustible mixture moves first axially of the impeller, thence radially and in a rotary manner during compression, thence downwardly and around the exterior portion of the housing and thence again axially of the impeller and down into the intake manifold.

A significant aspect of the supercharger is the introduction of a driving turbine within the shallow supercarger chamber in a position which would normally be shaped to direct the smooth non-turbulent flow of the compressed combustible mixture through such shallow chamber, with the result that the turbine drive for the compressing impeller is actually within the chamber containing such impeller, thereby securing many advantages including compactness, long life and significant heat transfer from the exhaust gases driving the turbine. The supercharger of the present invention may also be considered as providing a system in which a compression chamber containing the combustible mixture is separated from a chamber containing the hot gases of combustion from the internal combustion engine which drives the turbine, so that a heat exchange occurs directly across a relatively thin membrane with advantages in converting heat energy in the exhaust gases to kinetic energy in the combustible mixture, and concomitantly reducing the operating temperature of the turbine. This in turn makes possible, but not necessary, the utilization of frictionless bearings within the supercharger chamber and between the turbine and impeller, with a resulting very short shaft and freedom from maintenance difficulties which such an arrangement makes possible.

Advantageously a small tube may be mounted between the crank case of the internal combustion engine and the top of the impeller housing to draw oil fumes and other crank case vapors into the supercharger, mix them thoroughly with the combustible mixture (in the gasoline portion of which they are substantially one hundred percent soluble), and deliver them with the combustible mixture to the cylinders of the engine where they will be completely burned. Within the supercharger chamber, and preferably at the outlet openings thereof immediately above the intake manifold, I mount a screen which is treated with a catalytic material to promote more complete combustion. The passage of the combustible mixture of gasoline and air with or without added crank case vapors through the catalytic screen produces several results in breaking up the particle size of the hydrocarbon material and preconditioning it for complete combustion without the development of incompletely oxidized substances normally contributing to smog and the like conditions when discharged through the exhaust system. While the supercharger of the present invention preferably utilizes the catalytic screen and the tubular connection for burning crank case vapors, it may be utilized to very good advantage without these features. Indeed, the performance figures discussed hereinbelow and illustrated in FIGS. 9 through 12 are based on performance without these two added features.

The supercharger of the present invention may be mounted in any position for use, for example, with marine engines having up-draft carburetors or small aircraft engines in which movement is sometimes horizontal and the supercharger would then stand on one edge. In most instances, however, utilizing internal combustion engines as in passenger automobiles or small trucks, the supercharger would occupy the position shown in FIGS. 1 and 6. For purposes of description, therefore, and in the claims, I have used such expressions as "upper," "lower" and the like, but such expressions are used in a descriptive sense and not in a limited sense. I wish to point out also that while the device of the present invention may be constructed of various sizes, very good results have been obtained when the overall vertical dimensions are say two-and-a-half to three inches, making the device readily mountable within the space available on commercial vehicles.

Referring now first to FIGS. 1 through 5, the supercharger device shown in such embodiment comprises a supercharger housing member 15, a separator plate 16, a turbine 17, an impeller 18, an upper adapter 19, and a lower adapter 21, the numerals 15 through 21 being utilized to identify each of the parts generally. The supercharger optionally also may employ a screen 22 which fits into the lower part of the supercharger chamber between the housing member 15 and the lower adapter 21. The upper and lower adapters 19 and 21 respectively act as covers for the housing member 15, and together these three members form a shallow supercharger chamber.

Figure 2:
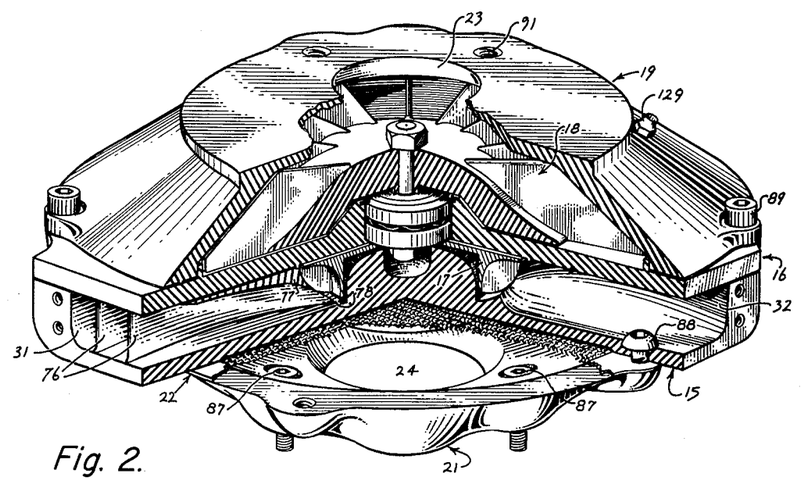
FIG. 2 is a similar view with parts broken away to illustrate structural features and the relationship of the parts, the view being enlarged with respect to FIG. 1 and comprising a full-scale showing of the same embodiment of the invention as illustrated in FIG. 1.
Figure 3:
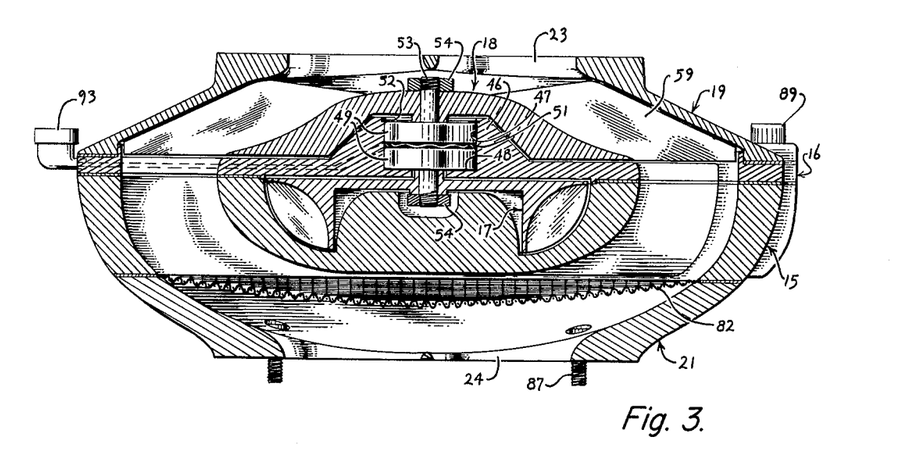
FIG. 3 is a transverse sectional view taken on the line 3—3 of FIG. 1, particularly illustrating the path of the combustible mixture through the supercharger.

As may be seen particularly by reference to FIGS. 2 and 3, combustible mixture passes downwardly through openings 23 (one opening 23 being normally provided for each barrel of the carburetor), is engaged by the impeller 18 and moves outwardly and downwardly in a smooth path to the lower part of the chamber, then back inwardly for discharge through the openings 24 in the lower adapter 21. For a more complete understanding of the movement of the combustible mixture during its compression and the flow of hot exhaust gases in driving the turbine 17, reference will first be made to additional structural features as they relate to the specific parts shown in exploded relation in FIGS. 4 and 5.

Looking now first at the housing member 15 and the subassembly comprising the separator plate 16, which parts together form in a sense a sub-assembly, the housing member has an annular exterior wall 26 forming in effect a part of a sphere with top face 27 comprising the greatest diameter portion and a bottom face 28 comprising the smallest diameter portion. The side wall 26 gradually curves inwardly from the edge of the top face 27 to the bottom face 28 as shown particularly in FIG. 3. Concentric with the side wall 26 but spaced therefrom is a housing portion 29 for the turbine 17. Leading from the exterior of the housing member 15 to the turbine housing 29 are an exhaust gas intake passageway 31 and an exhaust gas discharge passageway 32.

The separator plate 16 has an annular exterior ring portion 33 which engages over the top face 27, and an inner circular plate portion 34 normally spaced therefrom so that combustible mixture may flow through the separator plate 16 down into the lower part of the housing member 15. A solid radial portion 36 extending from the center portion 34 to the periphery of the separator plate 16 engages over the intake passageway 31 to provide a closed pathway for the incoming exhaust gases under pressure specifically controlled in a manner which will be explained further hereinbelow. A similar radial portion 37 acts to cover the exhaust port 32 of the housing member 15. A spacing rib 38 also ties the exterior annular portion 33 of the separator plate to the inner circular portion 34 (FIG. 5) so that with the rib 38 and the radial projections 36 and 37 arcuate slots 39, 41 and 42 are provided through the separator plate 16 for the downward movement of the combustible mixture through the housing member 15, and these arcuate slots comprise a substantial portion of the circumference of the separator plate 16.

Figure 5:
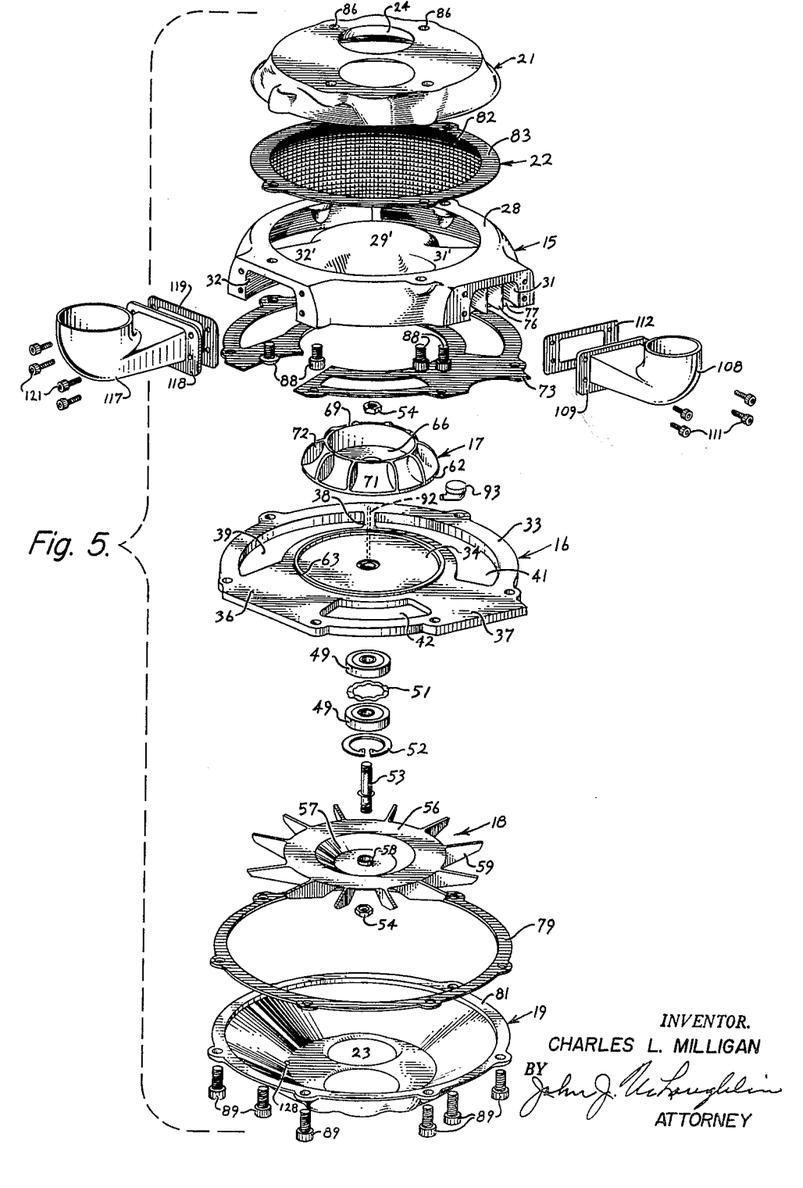
FIG. 5 is a further exploded view of substantially all of the parts of the compressor but reversed in position with respect to the other views so that the bottom faces of the parts not shown in FIG. 4 will be made clear.

Referring now particularly to FIGS. 2 and 3, the separator plate 16 has a central projection 46 at the top side thereof, this side being opposite to the face of the separator plate which is visible in FIG. 5. A central annular recess 47 extends substantially through the projection 46, except for an annular web 48 which is shown clearly in FIG. 3. A pair of small ball bearings 49 with the usual inner and outer races are supported within the annular central recess 47 and are separated by a crimped spring washer 51. A snap ring 52 engages within an inner annular recess near the top of the recess 47 and engages over the uppermost of the two bearings 49 to hold both bearings 49 firmly within the central recess 47. A relatively short shaft 53 extends through the two bearings 49 and through both the turbine 17 and the impeller 18. Nuts 54, secured to the threaded ends of the shaft 53, hold the parts in assembled relation as will be described.

Considering now first the impeller 18, this part comprises a central solid portion 56 of generally mushroom shape but having a bottom recess 57 into which projection 46 and the bearings assembly extend, and a relatively small integral annular projection 58, which engages the center race of one of the ball bearings 49. The impeller 18 also includes a plurality of radial uniformly spaced ribs 59 integral with the solid center portion 56. The ribs 59 have a special shape as will be described conforming with the inner surface of the upper adapter 19 and functionally designed to move and compress gases brought into contact with them.

Figure 4:
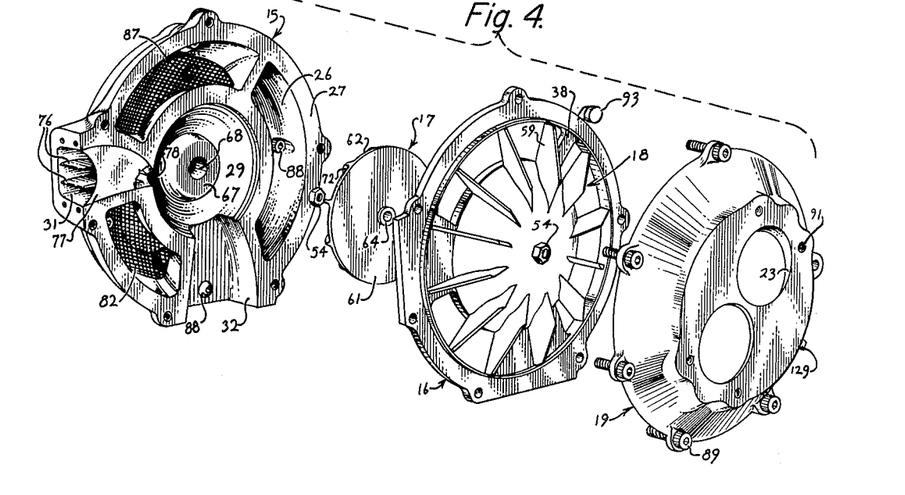
FIG. 4 is an exploded view showing some of the principal parts of the supercharger looking particularly at the top faces of the several parts.

The turbine 17 has a main solid body portion 61 with a flat-bottomed face engaging close to the flat face of the center portion 34 of the separator plate 16, and a skirt 62 within and close to an annular projection 63 from the face of the separator plate 16. The flat-bottomed face of the turbine carries a small annular projection (FIGS. 3 and 4)

which engages the inner race of the lowermost ball bearing 49. The bottom of the turbine 17 has a recess 66 into which projects an integral center boss 67 within the turbine housing portion 29 of the housing member 15. The center of the boss 67 is in turn apertured as at 68 (FIG. 4) so that the nut 54 and end of the shaft 53 may be projected therein without affecting the close dimensioning of the turbine 17 with respect to the side walls of its housing 29. Referring now further to the turbine 17, the body portion has an annular rim 69 concentric with the skirt 62, and the face 71 of the body portion of the turbine is uniformly arcuately concaved between these two extremes. A plurality of blades 72, integral with the body portion of the turbine, are uniformly spaced with respect to each other and disposed radially with respect to the center of the turbine. Each of the blades 72 is exteriorly convexed, so that considering the concaved character of the surface 71, the blades 72 define an oval shape pointed at their two ends.

Since the bearings are supported by the separator plate 16, and these bearings with their shaft 53 support the turbine 17 and impeller 18, the separator plate, turbine and impeller are a sub-assembly. The hot products of combination from the internal combustion engine which drive the turbine 17 are separated from the combustible mixture which passes from the upper portion to the lower portion of the supercharger chamber in the course of its compression by the impeller 18. Where the separator plate 16 and housing member 15 come together, a relatively large gasket 73 and relatively small gasket 74 engage between the matching surfaces of the housing member 15 and separator plate 16. The particular manner in which these members are bolted together will be pointed out hereinbelow. I wish to note here, however, that the bearings 49 also act as a seal between the hot products of combustion and the combustible mixture. In some experimental units I have provided a series of concentric rings between the turbine and impeller on the one hand and the separator plate 16 on the other hand to define a tortuous path limiting gas movement from one part of the unit to another. With the manner of mounting the bearings 49 as shown, and with the narrow space between the rotating surfaces and stationary surfaces on the separator plate 16, absolutely no evidence of leakage even under most extreme operating conditions has been found.

Looking now further to the housing member 15 and particularly the passageway 31 for the incoming hot combustion gases, I provide a pair of vanes 76 within such passageway, and above the vanes a specially shaped covering membrane 77, so that gases enter the passageway 31 between the vanes 76 without turbulence and are gradually restricted so as to produce a relatively high speed movement without turbulence terminating at a jet-like opening 78 which directs the jet of hot combustion gases against the bottom edge of the turbine 17 near the rim 69 and against the blades 72. The gas rises smoothly and in a rotating manner along the surface 71 and is discharged through the full open throat of the passageway 32, so that a maximum non-turbulent flow of gas results such as to impart the maximum rotational impact and force to the turbine. Thus, even though the turbine is inexpensively and symmetrically constructed, very efficient turbine operation is obtained with speeds of the order of 30,000 r.p.m. even when only part of the exhaust gases is diverted to the supercharger. The manner in which this diversion occurs and the manner in which the gases exhausted through the passageway 32 are scavenged to atmosphere will be made clear from a later description of a preferred manner of installation.

The inner surfaces of the supercharger chamber are shaped to minimize turbulence. As may be noted with particular reference to FIGS. 2 and 3 the interior of the upper adapter 19 is smooth and rounded, gradually flaring outwardly, and with the impeller blades 59 snugly fitting the inner surfaces. A gasket 79 forms a seal between a bottom annular plane surface 81 of the upper adapter and the matching surface on the separator plate 16. As may be noted by particular reference to FIG. 3, the inner walls of the separator plate 16 where the arcuate slots 39, 41 and 42 provide access to the lower portion of the supercharger chamber are tapered so that a continuous uniform sweep without obstruction occurs between the matching inner surfaces of the upper adapter 19, the separator plate 16 and the housing member 15. This same smooth now inwardly tapering surface continues to the lower adapter 21. It will be noted that the back portion 29' and back portion 31' and 32' (FIG. 5) of the turbine housing and turbine intake and discharge passageways are also rounded to avoid turbulence, thereby affording a smooth free path for the compressed combustible mixture as it is delivered downwardly and inwardly for discharge into the intake manifold of the internal combustion engine.

Between the lower adapter 21 and housing member 15 I interpose a suitable screen, such as shown, in which the center portion 82 comprises a suitably treated metal screen and an outer integral gasket 83 which forms a seal between the two members. The screen is formed from or comprises a metal coated with a suitable catalytic material such as a radio-active material or a catalytically active oxide, such for example as vanadium pentoxide, thorium oxide or the like, having the effect of breaking down the size of the hydrocarbon particles and activating them catalytically for substantially complete combustion.

Looking particularly at FIG. 3, all of the gaskets are suitably of a standard thickness and the matching parts provide for a controlled smaller distance between surfaces covered by the gaskets. This is a relatively old expedient, I am aware, but it produces very good results in the device of the present invention, because it permits drawing the fastening bolts up tightly and compressing the gasket for maximum seal without denaturing the gasket material because of the application of excess pressure thereto.

There are various ways in which the supercharger of the present invention may be secured together, but I preferably utilize the standard mounting centers normally employed to secure the carburetor to the intake manifold bracket. Illustratively, the lower adapter 21 is provided with a plurality of holes 86 matching the tapped holes in the intake manifold bracket. Button-headed Allen screws 87 (FIG. 2) or other suitable attaching screws are employed to mount the lower adapter to the intake manifold bracket with the openings 24 in the lower adapter matching the openings in the intake manifold bracket. The housing member 15 is then attached to the lower adapter 21, with the screen gasket 83 intervening, by means of Allen headed screws 88. The assembly comprising the separator plate 16 with the turbine and impeller assembled to it is then mounted on the housing member 15. The same Allen screws 89 which affect this assembly also attach the upper adapter 19 together with, of course, the several gaskets provided for between the parts. It will be noted by reference to FIGS. 1 through 5 that the upper adapter 19 is also provided with a plurality of threaded attaching holes 91. The carburetor is secured to the top of the supercharger utilizing these holes 91 and the standard attaching holes and attaching hardware provided for the regular carburetor installation. I wish to point out again that the number of holes 23 and 24 in the upper and lower adapters respectively matches the carburetor in the automobile carburetion system provided for on the particular car or truck to which the supercharger is applied. The number and disposition of attaching holes and other structural aspects of the two adapters are such as to conform to the particular carburetor and intake manifold gasket encountered, the remaining portions of the supercharger always being the same except insofar as the size may be changed to accommodate extremes in motor sizes. In general, however, most commercial vehicles employing internal combustion engines may utilize the same supercharger without major change and greatly improved efficiency obtained.

The supercharger embodying the device of the present invention may be lubricated in any suitable manner. I have obtained very good results, however, in the embodiment shown by providing a passageway 92 through the rib 38 terminating in the annular recess 47 in the separator plate 16 between the two bearings 49 and in alignment with the crimped spring washer 51. The outer end of the passageway 92 is enlarged and threaded to receive a grease cup 93. The grease cup 93 may, for example, be a Pratt-Gilbins type grease cup of the type applying continuous pressure to the grease to force it into the bearings, and the dimension of the cup is suitably such as to hold ⅛ ounce of grease. Any grease suitable for the purpose may be used such as the product known as Molydisulfide in Retainix grease.

Figure 1:
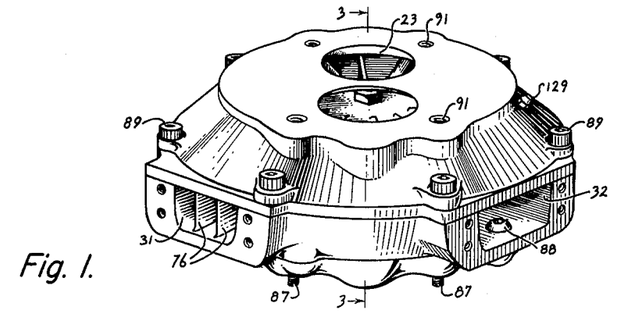
FIG. 1 is a perspective view showing the supercharger in condition for application to an internal combustion engine between the intake manifold and the carburetor.
Figure 6:
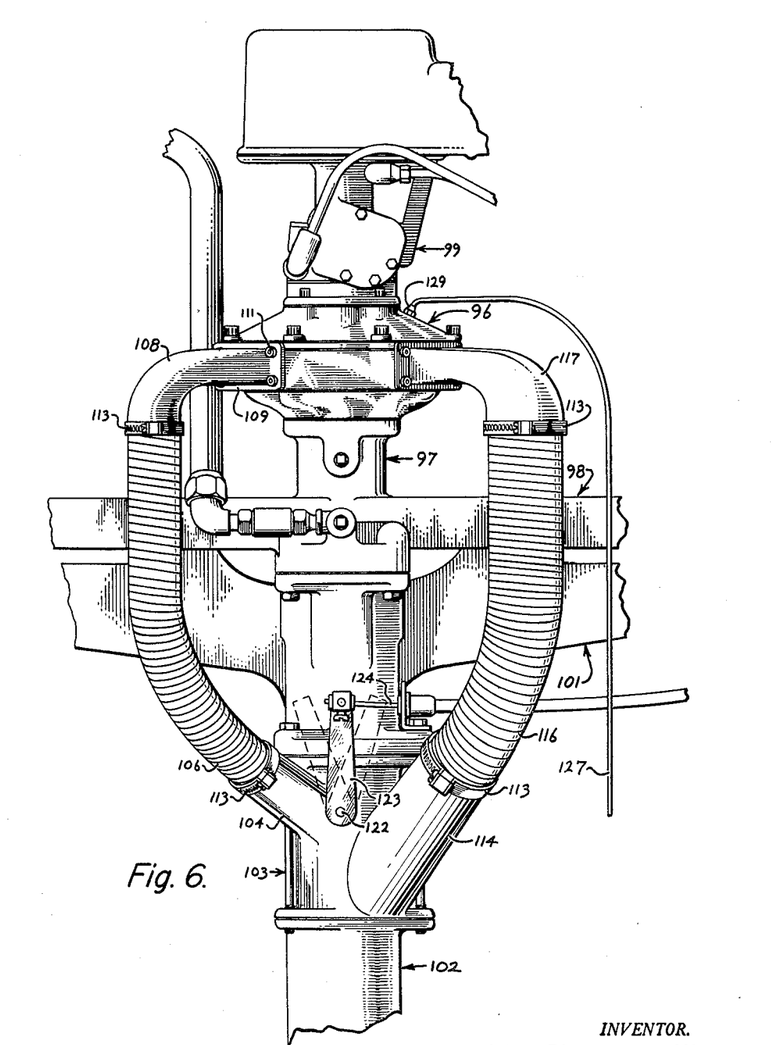
FIG. 6 is an elevational view partly broken away showing the manner in which the supercharger may be mounted on an internal combustion engine assembly.
Figure 7:
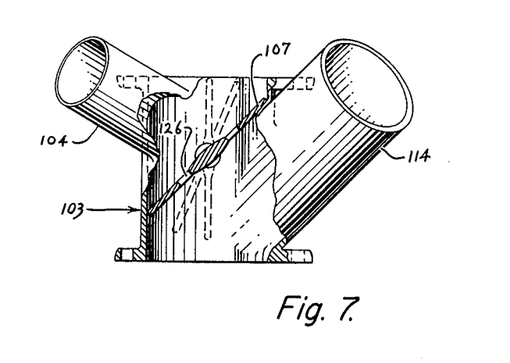
FIG. 7 is a vertical sectional view of the portion assembly which diverts exhaust gases of combustion to the supercharger turbine, including an adjustable butterfly valve for controlling the proportion of the exhaust gases delivered to such turbine.

A preferred manner of mounting the supercharger of the present invention is indicated in FIGS. 6 and 7, in which the supercharger shown in FIG. 1 indicated generally by the reference character 96 is mounted directly to an attaching bracket 97 above an intake manifold 98 in the same place where a carburetor indicated by the reference character 99 would normally be attached. As shown in FIG. 6, the carburetor 99 is attached directly to the top of the supercharger 96 in place of the bracket 97 as in the normal installation. The exhaust manifold indicated generally by the reference character 101 is connected into a down pipe 102 leading to a muffler (not shown); but a special shaped housing member 103 is interposed functioning to deliver gas under pressure from the exhaust system to the supercharger and receive the exhaust gas from the supercharger for delivery back through the regular internal combustion engine exhaust system.

Looking now particularly at FIG. 7, a generally radial take-off pipe 104 is provided to pass gas to a flexible tube 106 leading to the supercharger, a butterfly valve 107 within the housing member 103 functioning to control the amount of gas delivered to the take-off pipe 104. An elbow 108 is secured over the passageway 31 of the supercharger through an integral base 109, and attaching screws 111 (note FIG. 5). A suitable sealing gasket 112 is provided between the base 109 and the flat outer face of the passageway 31. Suitable commercial clamping rings 113 are provided at top and bottom of the flexible tube 106 to attach the flexible tube to the take-off pipe 104 and elbow 108 respectively.

An offset gas return tube 114 projects generally radially from the housing member 103 below the butterfly valve 107, and a flexible tube 116 somewhat larger than the flexible tube 106 connects between elbow 117 and the offset tube 114. An attaching base 118 is provided on the elbow 117 and fastening screws 121 mounting the base and an integral gasket to the flat exterior surface of the exhaust passageway 32. The butterfly valve 107 is mounted on a transverse shaft 122 to which is secured an exterior arm 123 adjustable from the driver's seat by a cable 124 and connected to have at least three positions, as indicated by the solid and dotted lines in FIG. 6. Thus the butterfly valve may be adjusted to divert substantially all of the hot products of combustion from the entire engine, or from one of two banks of cylinders if desired; or the butterfly may be adjusted to deliver no products of combustion in the event one should wish to discontinue the supercharger operation entirely. If for any reason the supercharger should not be operated, the internal combustion engine will operate in accordance with its rated performance as if the supercharger had never been installed. This should be contrasted with superchargers where the engine cannot be operated at all unless the supercharger is in operation. The butterfly valve 107 may also be adjusted at an intermediary position or positions to control the amount of hot gases going into the supercharger and therefore the speed of rotation of the supercharger at various engine speeds. It will be noted that the butterfly valve has two relatively small arcuate slots for the passage of some of the products of combustion even when otherwise the butterfly valve is completely closed.

Figure 8:
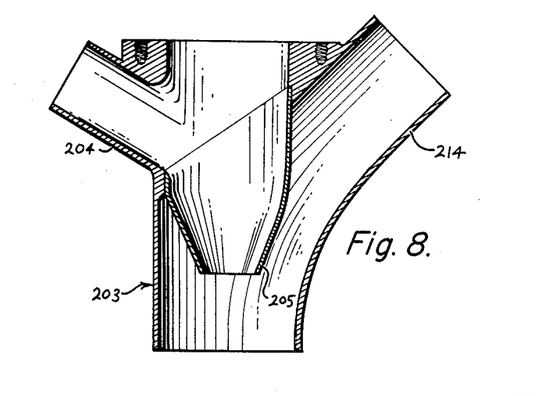
FIG. 8 is a view similar to FIG. 7 but showing a modification in which the proportion of gases diverted to the supercharger is substantially constant.

Instead of operating the supercharger on a controlled speed basis by the use of the butterfly valve 107, I may provide a fixed type of casting as indicated in FIG. 8 in which the housing 203 has a take-off tube 204 above a forcing nozzle 205, and an offset return tube 214 communicating with the housing 203 at a position below the forcing nozzle 205. In this arrangement the constriction at the forcing nozzle 205 will cause some of the hot gases to be forced out through the tube 204, and the forcing nozzle 205 will also have a tendency to entrain returning gases from tube 214 to facilitate exhaust action. It is obvious that some of the features of FIGS. 7 and 8 may also be combined if desired.

As part of a standard installation I may also provide a tube 127 leading from the crank case (not shown) of the internal combustion engine to the supercharger chamber above the impeller. Thus the tube 127 is adapted to deliver crank case vapors to the supercharger, and its upper end is connected to an opening 128 in the upper adapter 19 by means of a fitting 129.

I have fabricated and extensively tested several supercharger devices employing the features of the present invention, including a supercharger substantially identical in details of construction to that shown in FIGS. 1 through 5, with upper and lower adapters for both single barrel and double barrel carburetors. General performance characteristics of internal combustion engines equipped with this supercharger device were very impressive. For example, when this particular supercharger was used on the engine of a relatively light aeroplane having a maximum ceiling of 12,000 feet, such ceiling was increased to 20,000 feet. Tests with internal combustion engines on automobile vehicles showed greatly improved performance. Several factors indicating the scope of such improvement will be explained hereinbelow. First, however, I wish to point out several details of performance of the supercharger embodiment shown in the drawings.

The hot products of combustion enter the turbine housing of the supercharger at about 1,000° F. and at a pressure of about 8 pounds per square inch. These gases are expanded as they drive the turbine and cooled to a temperature of approximately 300° F. Actual tests have shown that the turbine 17 rotates at substantially constant speed in the pulsating system comprising the pulsating exhaust from the internal combustion engine cylinders. Since the turbine continues to rotate at constant speed it scavenges exhaust gases between pulses, thereby allowing the next pulse to enter a partial or relative lower pressure area created by the turbine's action.

In the ordinary internal combustion engine operated in a surface vehicle, the combustible mixture leaving the carburetor normally has a temperature of the order of 38° F. to 45° F. The temperature of the combustible mixture leaving the supercharger of the present invention is generally of the order of 100° F. to 120° F. By suitable design and control the combustible mixture entering the engine cylinders may therefore be raised to the maximum desired temperature for greatest performance, such temperature of course being sufficiently below the detonating temperature that pre-ignition during a compression stroke will be avoided.

Since the bearings are mounted in such close relation to the turbine 17, which in turn is contacted by exhaust gases of about 1,000° F., it is essential that the bearings be capable of performance under these operating conditions. I have found that a commercial stainless steel double-shielded bearing, originally developed for missile work, can be purchased (and I have used them with very good satisfaction), which is guaranteed to operate at 600° F. and at 40,000 r.p.m. for at least 3800 hours, which latter time figure represents approximately five years of driving for the ordinary automobile driver. The bearings, therefore, will last substantially for the life of the supercharger or vehicle in which it is installed. The bearings 49 are nevertheless very easily and inexpensively replaced. Only simple lubricating care is necessary, such as readily obtained at the ordinary service station equipped to grease vehicles.

The supercharger of the present invention has been employed experimentally and with very good results on, for example, a 1955 Buick Special, a 1953 Ford V-8, a 1953 Chevrolet 6, a small GMC six-cylinder 1956 pick-up truck and a 1957 Chevrolet truck engine. More extensive testing was done, however, with a relatively new GMC Model 302 engine (180 H.P.) in a Model 450 GMC truck, and FIGS. 9 through 12 show graphically some of the results of such tests.

Figure 9:
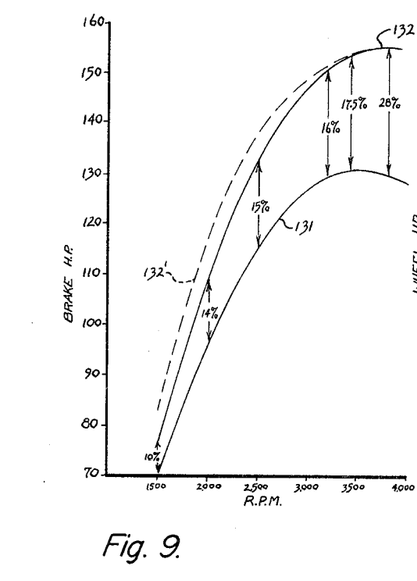
FIGS. 9 through 12 are graphs showing performance data.

In FIG. 9, the solid curved line 131 shows the brake horsepower calculated from certified GMC horsepower data with a standard carburetor installation without a supercharger; which solid curved line 132 shows brake horsepower using the supercharger of the present invention mounted in the general manner shown in FIG. 6, but without the variable control characteristic of FIG. 7. In all instances readings representing parts through which the curves were drawn were taken after the engine had operated at least eight hours continuously at the speed indicated. Comparing the curves 131 and 132 it will be noted that the brake horsepower at 1500 r.p.m. was increased approximately ten percent and at 3750 r.p.m. approximately twenty-eight percent. The broken line 132' shows the same type of results using the supercharger when the butterfly valve 107 was used and controlled to increase the speed of the turbine 17 at lower engine speeds. I have not given exact figures for percentage increase as shown by the broken line 132' because the results depend to a considerable extent upon the specific setting and control of the butterfly valve 107. I have determined, however, that at 1500 r.p.m. the percentage increase is about doubled that indicated by line 132, that is about a twenty percent increase in brake horsepower as compared to the non-supercharged engine. The curve 132' merges with curve 132 at its top, so that at the top speed of 3500 to 4000 r.p.m. the results are approximately the same with and without the butterfly valve, because in both instances the speed of the turbine 17 will be about 30,000 r.p.m.

Figure 10:
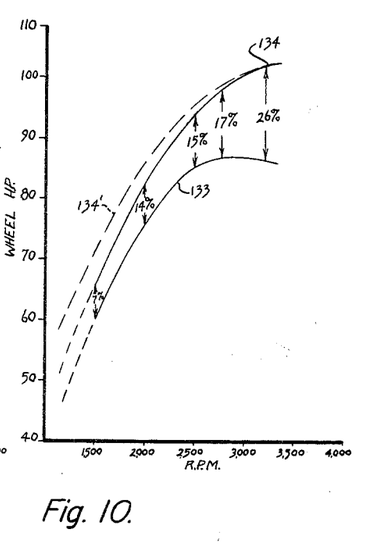

In FIG. 10 the curves show corresponding increases for wheel horsepower, measured at the rear wheels by means of a Clayton dynamometer. As in FIG. 9, the vertical ordinate shows horsepower and the horizontal ordinate shows the number of engine revolutions per minute. The solid curved line 133 indicates brake horsepower without the supercharger and the solid line 134 with the supercharger. The broken line 134' shows horsepower date when the supercharger is operated at substantially increased speed at lower engine speeds by means of a regulating butterfly valve 107.

Figure 11:
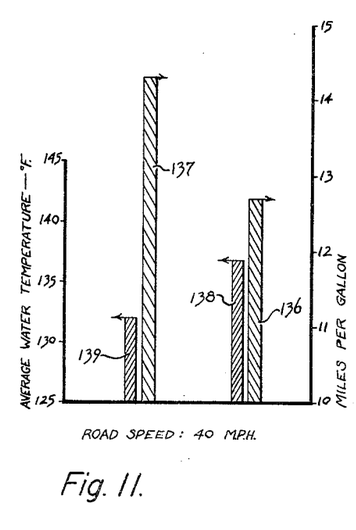

FIG. 11 is a combined band type chart with the mileage shown at the right and the average engine water temperature shown at the left. The top of band 136 shows an average mileage 12.7 miles per gallon for the GMC type 302, No. 340 truck without the supercharger, with continuous operation at 40 m.p.h. for 92.8 miles. The band 137 shows an average mileage of 14.3 miles per gallon when the supercharger of the present invention was used. In this instance the test was at 40 m.p.h. for 148.3 miles. In the same chart, band 138 shows an average engine temperature of about 137.6° F. when the truck was operated at 40 m.p.h. while band 139 shows an average engine temperature of only about 132° F. when the supercharger was used under the same conditions.

Figure 12:
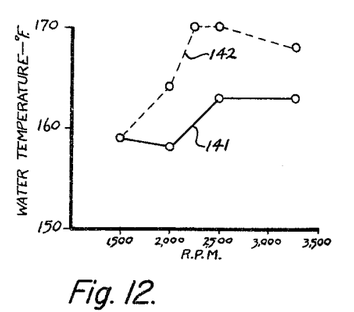

In FIG. 12 the solid line 141 shows the average operating temperature of the same engine between about 1500 r.p.m. and 3250 r.p.m. The range of water temperature between about 158° and 163° when the supercharger is used, but the average temperature over the same range of engine speed when the supercharger is not used is between about 159° and 170° as shown by the broken line 142.

As already indicated, the supercharger of the present invention may be utilized as standard equipment, or installed very easily and inexpensively as an accessory device. In either case, improvement in performance is marked. A very significant feature, moreover, is the fact that the supercharger of the present invention may be built to sell at one fourth to one half the price of comparable commercial supercharger devices of the prior art.

The supercharger of the present invention operates in several ways to produce improvements in engine performance as measured by substantially all of the usual characteristics including such things as carbon deposition, maximum altitude of aircraft, improvements in marine engine performance and improvements in the performance of internal combustion engine equipped vehicles. The improvements resulting from the use of the supercharger may be taken advantage of in various ways. In accordance with one approach, for example, a leaner mixture or a relatively lower grade of fuel may be employed to obtain substantially the same type of performance at lower fuel cost. Without change in the carburetor setting and without change in the fuel, the supercharger of the present invention will pay for itself in a short time while still providing improved performance. When operating a highway truck, for example, it is usually possible to save one gear on grades, which means that in many types of operations a relatively light truck with an internal combustion engine may make a complete trip without gear change and with thus improved mileage and higher speeds during commercial delivery operations.

Those skilled in the art will understand that many changes in specific structure shown may be used. In the special arrangement shown, the lower adapter is secured directly to the bracket 97, the housing member 15 then secured to the lower adapter, and the separator plate assembly and upper adapter then secured grouped to the housing member. This arrangement provides the maximum compactness and assumes a more or less complete dismantling of the unit for inspection and service when required. It should be noted that it is impossible to assemble the supercharger incorrectly, the parts fitting together only in one way. The arrangement provides for easy replacement of the catalytic screen. It is obvious that means may be provided to attach the entire supercharger as such to the manifold bracket 97, or to provide a separate sub-assembly comprising the housing member 15, separator plate 16 and upper adapter 19, so that the catalytic screen may be quickly exposed for inspection and replacement without disassembly of any other part of the device. The specific arrangement is merely a matter of arrangement of the fastening screws. I have found, for example, that with some forms of catalytic screens, replacement may be necessary as often as every ninety days with extreme driving, in which case ready availability of the screen may be important. In some instances the life of the screen may be substantially greater and the specific arrangement shown may be preferred.

I have disclosed and described a preferred form of the embodiment in detail so that those skilled in the art will understand the best manner of practising the invention, but the scope of the invention is defined by the claim.

I claim:

In a supercharger of the character and for the purpose described, (a) a separator plate, (b) an impeller at one side of said plate, (c) a turbine at an opposite side of said plate, (d) a pair of ball bearings with their outer races supported in a central recess within the separator plate,
(e) a shaft extending through said ball bearings, separator plate, impeller and turbine,
(f) nuts on ends of said shaft engaging said impeller and turbine to engage a portion of each against inner races of said ball bearings,
(g) housing means forming a turbine housing on one side of said separator plate and an impeller housing on the opposite side of the separator plate, and
(h) means forming intake and outlet passageways to both the turbine housing and impeller housing.

References Cited by the Examiner

UNITED STATES PATENTS

| | | | |
|---|---|---|---|
| 2,129,808 | 9/38 | Bentley | 230—134.1 |
| 2,537,117 | 1/51 | Alward | 123—119 |
| 2,775,400 | 12/56 | Cox | 230—116 |
| 2,777,632 | 1/57 | Kishline et al. | 230—116 |
| 2,878,797 | 3/59 | Madden | 60—13 X |
| 2,899,949 | 8/59 | Hicks | 123—119 |
| 2,903,847 | 9/59 | Boyd | 60—13 |

JULIUS B. WEST, *Primary Examiner.*

ABRAM BLUM, *Examiner.*